United States Patent [19]

Greger

[11] Patent Number: 5,730,483
[45] Date of Patent: Mar. 24, 1998

[54] SYSTEM FOR ADJUSTING A WINDSHIELD FOR VEHICLES

[75] Inventor: Martin Greger, Karlsfeld, Germany

[73] Assignee: Bayerische Motoren Werke Aktiengesellschaft, Munich, Germany

[21] Appl. No.: 669,649

[22] Filed: Jun. 24, 1996

Related U.S. Application Data

[63] Continuation of Ser. No. 450,570, May 25, 1995, abandoned.

[30] Foreign Application Priority Data

May 31, 1994 [DE] Germany .................. 44 18 954.0

[51] Int. Cl.⁶ .................................................. B62J 17/04
[52] U.S. Cl. ................................. 296/78.1; 296/96.2
[58] Field of Search .......................... 296/78.1, 96.2, 296/77.1; 49/249, 248

[56] References Cited

U.S. PATENT DOCUMENTS

| | | | |
|---|---|---|---|
| 2,919,155 | 12/1959 | Williams et al. | 49/248 X |
| 3,574,392 | 4/1971 | Hirano | 296/91 |
| 4,294,039 | 10/1981 | Dalheimer et al. | 49/248 |
| 4,696,509 | 9/1987 | Yagasaki et al. | 296/78.1 X |
| 4,915,443 | 4/1990 | Verlings et al. | 49/248 X |

FOREIGN PATENT DOCUMENTS

| | | | |
|---|---|---|---|
| 642431 | 8/1928 | France | 296/96.2 |
| 774412 | 12/1934 | France | 296/107 |
| 1561201 | 3/1969 | France | 296/78.1 |
| 8607843.7 | 7/1986 | Germany . | |
| 3609595 | 9/1987 | Germany | 296/78.1 |
| 3941875 | 6/1991 | Germany . | |
| 61189 | 3/1991 | Japan | 296/78.1 |
| 65483 | 3/1991 | Japan | 296/96.2 |
| 368106 | 4/1973 | U.S.S.R. . | |
| 1481132 | 5/1989 | U.S.S.R. | 296/77.1 |
| 221326 | 9/1924 | United Kingdom . | |
| 318372 | 9/1929 | United Kingdom | 296/96.2 |
| 432076 | 7/1935 | United Kingdom | 296/96.2 |
| 486067 | 5/1938 | United Kingdom | 296/78.1 |

OTHER PUBLICATIONS

Patent Abstracts of Japan, M–1119, JP 3–61189 A, May 31, 1991, vol. 15, No. 215.

*Primary Examiner*—Dennis H. Pedder
*Attorney, Agent, or Firm*—Evenson, McKeown, Edwards & Lenahan, P.L.L.C.

[57] ABSTRACT

A system is provided for adjusting a windshield for vehicles, particularly for motorcycles. The windshield is continuously adjusted in its height as well as in its inclination. Two pairs of guide arms are provided which are arranged above one another and which are hinged to the windshield as well as to the vehicle body to form a four-bar joint. In some embodiments, the guide arms are driven by way of an electric motor and the windshield is raised or lowered in this manner. In other embodiments the windshield is manually adjustable.

24 Claims, 1 Drawing Sheet

5,730,483

SYSTEM FOR ADJUSTING A WINDSHIELD FOR VEHICLES

This application is a continuation of application Ser. No. 08/450,570, filed on May 25, 1995, now abandoned.

BACKGROUND AND SUMMARY OF THE INVENTION

The present invention relates to a system for adjusting a windshield for vehicles, particularly for motorcycles, by means of which the windshield is arranged to be adjustable in its height in an articulated manner on actuating elements whose positions can be changed.

This type of a system is known from German Patent Document DE-C2 39 41 875. In this construction, at least two guide rails arranged in the longitudinal direction of the vehicle are inclined at different levels for the purpose of an adjustment. Sliding blocks, on which the windshield is swivellably held, run in the guide rails. By means of the differently inclined guide rails, the windshield can be adjusted in its height as well as in its inclination.

Because of the considerable number of components—guide rail, sliding blocks, fastening elements, etc. —, the windshield requires fairly high expenditures with respect to its construction and therefore results in high manufacturing costs. In addition, the whole arrangement has an undesirably high weight. Finally, the known construction tends to jam as soon as dirt or dust collects in the guide rails.

It is therefore an object of the invention to provide a windshield adjusting system which, while the capacity to adjust its height and its inclination is maintained, has a simple construction and a reliable operation.

According to the invention, this object is achieved by providing an arrangement wherein the actuating elements comprise guide arms which are arranged above one another viewed in a flat dimension of the windshield, said guide arms forming a four-bar joint with each guide arm connected on one side with the windshield and on the other side with the vehicle body in an articulated manner with essentially horizontally aligned swivel axes extending transversely with respect to a longitudinal vehicle center.

In the present invention, rails corresponding to the prior art are omitted. Instead, the invention uses guide arms which, while forming a four-bar joint, hold the windshield on the vehicle body so that its position can be changed. Since the joints are pure hinges, they are largely insensitive to dirt. On the other hand, the setting and the length of the individual guide arms result in a large clearance for the moving path of the windshield. A prerequisite for a perfect moving sequence is the position or alignment of the swivel axes of the four-bar joint. They extend essentially horizontally and transversely to the longitudinal direction of the vehicle.

Because of the use of guide arms, the position of the windshield can be adjusted in a simple manner. It can therefore be adapted without any problems as a wind and weather protection device to the driver's height or to the height adjustment of the seats. The adjustment can be carried out manually as well as by other technical devices, such as electric motors, hydraulic systems, etc. In the case of a manual adjusting possibility, the windshield must only be pulled upward or pressed downward by the driver. In this case, it was found to be expedient to design the adjustment in two steps and therefore only to provide an upper and a lower end position. In an advantageous embodiment, an over-dead-center spring secures the windshield in the respective end position. In addition, by means of this spring, tolerances in the adjusting system are eliminated.

Furthermore, it is possible to also permit an adjustment of the windshield in intermediate positions. In the respective end positions and in the possible intermediate positions, it is also advantageous to lock the windshield so that it is not adjusted by the air stream. However, by means of a correspondingly adjusted friction in the joints, such a locking may also be omitted.

In the case of an electric-motor type construction, a continuous adjustment must expediently be provided. The windshield is securely held in any position by means of self-locking intermediate gears. An adjustment by the air stream is therefore prevented.

The invention requires only one set of guide arms. However, for reasons of stability, it may be desirable to add another set. In this case, it is advantageous to fasten a support strip on the interior side of the windshield. The individual guide arms are disposed in an articulated manner on each side on the support strip which extends essentially horizontally and along a large portion of the width of the windshield.

In the case of this embodiment, it is another advantage to connect the lower guide arms with one another in a non-rotatable manner by way of a rod-shaped shaft. In another advantageous further development of the invention, an intermediate gear may be arranged on the shaft, which intermediate gear is actuated by an electric motor.

By means of the simple construction, the adjusting system can be adapted to different vehicle types without any significant change of the components. This results in a largest possible, seasonably priced equal-parts principle- Because of its construction, the adjusting system of the whole results in lower costs and has a lower weight, is distinguished by a simple mechanism and permits the use of low-cost parts, such as plastic parts, etc.

Other objects, advantages and novel features of the present invention will become apparent from the following detailed description of the invention when considered in conjunction with the accompanying drawings.

DETAILED DESCRIPTION OF THE DRAWINGS

Figure 1:
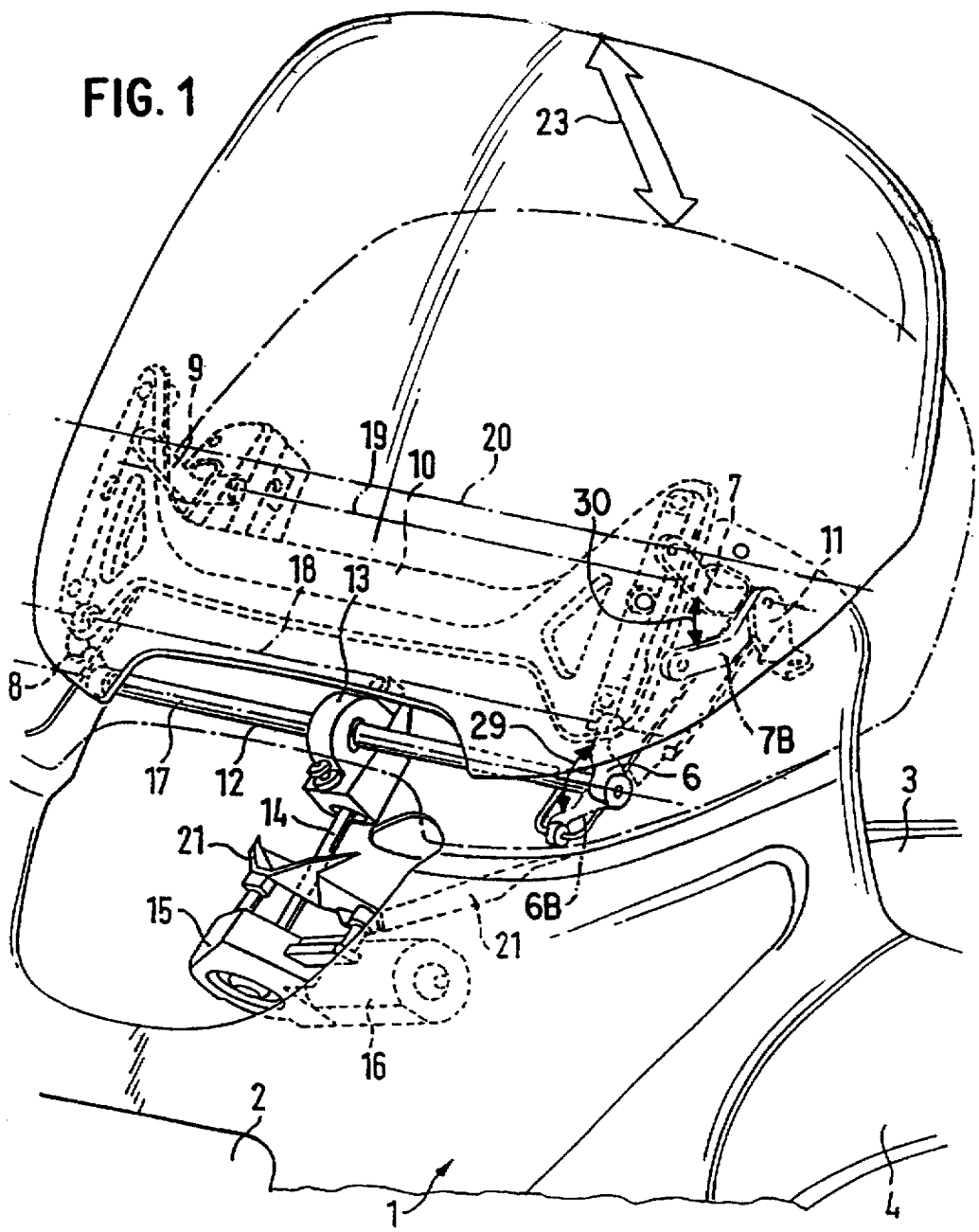
FIG. 1 is a perspective representation of the forward section of a motorcycle or of its covering, comprising an electrically adjustable windshield constructed according to a preferred embodiment of the invention.

A covering 1 according to FIG. 1 has several sections. An opening 2 is provided for receiving a main headlight; in another section 4, a rearview mirror is arranged which is not visible. Behind the covering, a motorcycle handlebar is situated which is not shown; a fuel tank 3 is outlined behind it.

In the upper section, the covering 1 changes into a windshield 5 which is adjustable in its height and inclination, as indicated by means of a double arrow 23. In the drawing, an upper end position of the windshield 5 is indicated by means of solid lines, while the lower position of the windshield 5 is illustrated by means of broken lines. It is the object of the windshield 5 to keep the air stream away from the driver or deflect it above the driver. As required, the driver can adjust the windshield to be deeper and flatter or higher and steeper.

For this purpose, a system for adjusting the windshield 5 is provided which consists of a core made of two sets of guide arms 6, 7 and 8, 9. In the case of each set of guide arms viewed in the flat dimension of the windshield 5 -, the two guide arms are arranged above one another. Above one another, in this case, means that, projected to a perpendicular vehicle center plane, guide arm 7 is situated above guide arm 6 and guide arm 9 is situated above guide arm 8.

Furthermore, for the linking of the guide arms, a support strip 10 is fastened in the lower section on the interior side of the windshield 5. The support strip 10 extends horizontally along a large portion of the width of the windshield 5. It has the shape of an extended H, in which case, the guide arms 6, 7 and 8, 9 are disposed by way of one hinge respectively on the two vertical legs of the H. This results in a secure connection of the guide arms with the windshield.

By means of their other ends, the guide arms 7 and 9 are rotatably disposed on the vehicle body by way of vehicle-fixed bearing blocks 11. For the purpose of a complete description, it should be pointed out that only one of the bearing blocks 11 can be seen in the drawing, specifically the right one, as viewed from the front of the motorcycle. In this case, the bearing blocks are fastened on a support plate which is not shown and which, in turn, is connected with a tube linkage which is also not shown and which is used as a holding device for the covering. This takes up the wind forces acting upon the windshield.

The ends of the lower guide arms 6 and 8, which are situated opposite the support strip 10, are non-rotatably connected with one another by means of a rod-shaped rotatable shaft 12. As a result of this articulated connection, each set of guide arms 6, 7 and 8, 9 represents a four-bar joint, in which case all axes of rotation are aligned in an essentially horizontal manner. In order to obtain a perfect sequence of movements, it is advisable to let the individual axes of rotation of the two four-bar joints coincide. The resulting joint axes have the reference numbers 17, 18, 19 and 20 in FIG. 1. In this case, the axis of rotation 17 is simultaneously the axis of the shaft 12.

With respect to its position, the shaft 12 is fixedly assigned to the vehicle body and, for this purpose, is disposed approximately in its center in a vehicle-fixed housing 13. Furthermore, it may be disposed at other points, which, however, is not illustrated in the drawing. The housing 13 encloses an intermediate gear which consists of a toothed wheel 12G which is held in a torsionally stable manner on the shaft 12 and which meshes with another toothed wheel 14G driven by way of another rotary shaft 14. The rotary shaft 14 leads to a second intermediate gear 15 housed in a housing. The intermediate gear 15 is finally driven by an electric motor 16 arranged in the same housing. The housing itself is connected with body-fixed parts, which is indicated by means of reference number 21.

The electric motor 16 can be switched on by way of a switch on the steering wheel which is not shown. Depending on how the switch is operated, it moves the windshield 5 upward or downward by way of the intermediate gears 15, 13. If, for example, the windshield 5 moves upwards, the shaft 12 and therefore the guide arms 6, 8 and 7, 9 rotate counterclockwise, for example, from position 6B to position 6 along arc 29, and from position 7B to position 7 along arc 30. The rotational speed of the electric motor 16 must be considerably geared down with respect to the rotary shaft 12. Because of this gearing down, the intermediate gears 15, 13 are self-locking; that is, an adjusted position of the windshield 5 will also not be changed by the pressure of the air stream. Finally, end position switches are situated in the intermediate gear which prevent the adjustment of the guide arms 6, 7, 8 and 9 beyond the end positions.

Figure 2:
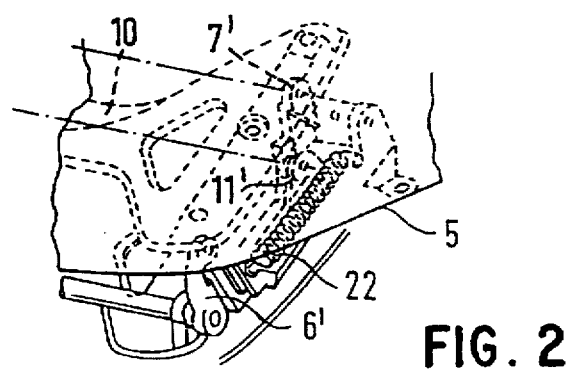
FIG. 2 is a sectional view of a manual windshield adjusting system for a motorcycle windshield such as depicted in FIG. 1, constructed according to another preferred embodiment of the invention.

FIG. 2 shows another preferred embodiment, generally similar to FIG. 1, but with a manual adjustment of the windshield 5 in steps. Guide arms 6' and 7' are visible again. In this case, guide arm 7' is constructed as a doubled-armed angle lever and is rotatably held in a bearing block 11' by means of its bent knee. As illustrated in FIG. 1 for guide arm 7, one arm end of the guide arm 7' is applied to the support strip 10 in an articulated manner, while a tension spring 22 is suspended on the other arm end. The other end of the tension spring 22 is held on a body-fixed section.

The windshield 5 according to FIG. 2 can be adjusted only into an upper and a lower end position. For this purpose, it is only manually pulled upward or pressed downward. Because of its linking to one angle leg of the guide arm 7', the tension spring 22 acts as an over-dead-center spring which holds the windshield in the lower as well as in the upper position. During the adjusting operation, the guide arm 7' or its angle leg connected with the tension spring 22 will swivel and will describe a circular arc. The spring 22 is stretched to a vertex which corresponds approximately to a center position of the windshield between an upper and a lower end position. In this position, the position of the windshield 5 is unstable and the tension spring 22 pulls the guide arm 7' and therefore the windshield either into one or the other stable end position.

For these end positions, the guide arms 6' and 7' have end stops which provides for a secure hold in the respective end position and prevent damage to painted parts or a rattling of the components. In addition, tolerances in the adjusting system are eliminated by way of the spring 22.

Furthermore, the adjusting mechanism of the manual adjustment is constructed in a fashion which is comparable to that of FIG. 1. In particular, in addition to the guide arms 6', 7', a pair of guide arms also exists on the other side and has the same construction. A spring which is comparable to the tension spring 22 is applied to the rearward upper guide arm corresponding to guide arm 9 of FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A windshield adjusting system for adjusting a windshield of a cycle type vehicle comprising:

first, second, third, and fourth guide arms which each have a first end and a second end, said first and second guide arms being disposed at one lateral side of a windshield longitudinal center of a windshield on a cycle type vehicle and said third and fourth guide arms being disposed at an opposite lateral side of the windshield longitudinal center, said first and third guide arms being pivotal about a first fixed horizontal axis at their respective first ends, with respective said second ends of the first and third guide arms being pivotally connected to the windshield about a first moving horizontal axis which moves along a first arc in a first direction of rotation with respect to said first fixed horizontal axis between an upper windshield end position and a lower windshield end position, said first moving horizontal axis moving along said first arc in a second direction of rotation opposite said first direction of rotation between said lower windshield end position and said upper windshield end position, said second and fourth guide arms being pivotal about a second fixed horizontal axis at their respective first ends, with respective said second ends of the second and fourth guide arms being pivotally connected to the windshield about a second moving horizontal axis which moves along a second arc in said first direction of rotation with respect to said second fixed horizontal axis between an upper windshield end position and a lower windshield end position, said second moving horizontal axis moving along said second arc in said second direction of rotation between said lower windshield end position and said upper windshield end position.

2. A windshield adjusting system according to claim 1, wherein said first and second guide arms and said third and fourth guide arms are disposed symmetrically with respect to a horizontal centerline of a windshield being supported thereby when in an in use position on the vehicle.

3. A windshield adjusting system according to claim 1, comprising means accommodating continuous adjusting movement of the guide arms and the windshield supported thereby between the respective upper and lower windshield end positions.

4. A windshield adjusting system according to claim 1, comprising means for locking the guide arms and the windshield supported thereby in positions intermediate the respective upper and lower windshield end positions.

5. A windshield adjusting system according to claim 3, comprising means for locking the guide arms and the windshield supported thereby in positions intermediate the respective upper and lower windshield end positions.

6. A windshield adjusting system according to claim 1, wherein said first guide arm is an upper guide arm which is disposed above the second guide arm, said second guide arm being a lower guide arm, wherein said third guide arm is an upper guide arm which is disposed above the fourth guide arm, said fourth guide arm being a lower guide arm.

7. A windshield adjusting system according to claim 6, comprising an electric motor drivingly connected to at least one of said lower guide arms.

8. A windshield adjusting system according to claim 6, wherein said first and second guide arms and said third and fourth guide arms are disposed symmetrically with respect to a horizontal centerline of the windshield being supported thereby when in an in use position on the vehicle.

9. A windshield adjusting system according to claim 8, comprising an electric motor drivingly connected to at least one of said lower guide arms.

10. A windshield adjusting system according to claim 7, wherein said electric motor is drivingly connected to both of said lower guide arms.

11. A windshield adjusting system according to claim 1, comprising a support strip fastenable in a lower section on an interior side of the windshield to extend transversely in use with respect to a longitudinal axis of the vehicle, and wherein said first and second guide arms are disposed on one lateral end section of the support strip in an articulated manner, and said third and fourth guide arms are disposed on an opposite lateral end section of the support strip in an articulated manner.

12. A windshield adjusting system according to claim 11, wherein lower ones of the guide arms at opposite lateral sides of the support strip are non-rotatably connected with one another at said first ends by means of a horizontally extending, rod-shaped and rotatable shaft.

13. A windshield adjusting system according to claim 12, wherein a toothed wheel is non-rotatably arranged on the shaft which meshes with a toothed wheel which is driven by an electric motor.

14. A windshield adjusting system according to claim 13, wherein another rotary shaft is connected between the electric motor and the driven toothed wheel.

15. A windshield adjusting system according to claim 14, wherein the electric motor drives the rotary shaft by way of an intermediate gear.

16. A windshield adjusting system according to claim 1, comprising an over-dead center spring having one end attached to one of said guide arms and an opposite end attachable to a fixed part of said vehicle.

17. A motorcycle including a windshield and a windshield adjusting system, said windshield adjusting system comprising:

first, second, third, and fourth guide arms which each have a first end and a second end, said first and second guide arms being disposed at one lateral side of a windshield longitudinal center and said third and fourth guide arms being disposed at an opposite lateral side of the windshield longitudinal center when in an in use position supporting the windshield on the motorcycle, said first and third guide arms being pivotal about a first fixed horizontal axis at their respective first ends, with respective said second ends of the first and third guide arms being pivotally connected to the windshield about a first moving horizontal axis which moves along a first arc in a first direction of rotation with respect to said first fixed horizontal axis between an upper windshield end position and a lower windshield end position, said first moving horizontal axis moving along said first arc in a second direction of rotation opposite said first direction of rotation between said lower windshield end position and said upper windshield end position, said second and fourth guide arms being pivotal about a second fixed horizontal axis at their respective first ends, with respective said second ends of the second and fourth guide arms being pivotally connected to the windshield about a second moving horizontal axis which moves along a second arc in said first direction of rotation with respect to said second fixed horizontal axis between an upper windshield end position and a lower windshield end position, said second moving horizontal axis moving along said second arc in said second direction of rotation between said lower windshield end position and said upper windshield end position.

18. A motorcycle according to claim 17, wherein said first and second guide arms and said third and fourth guide arms are disposed symmetrically with respect to a motorcycle center line.

19. A motorcycle according to claim 18, comprising means accommodating continuous adjusting movements of the guide arms and the windshield supported thereby between respective said upper and lower windshield end positions.

20. A motorcycle according to claim 18, comprising means for locking the guide arms and the windshield supported thereby in positions intermediate respective said upper and lower windshield end positions.

21. A motorcycle according to claim 18, wherein said first guide arm is an upper guide arm which is disposed above the second guide arm, said second guide arm being a lower guide arm, wherein said third guide arm is an upper guide arm which is disposed above the fourth guide arm, said fourth guide arm being a lower guide arm, and wherein an electric motor is drivingly connected to at least one of said lower guide arms.

22. A motorcycle according to claim 21, wherein said electric motor is drivingly connected to both said lower guide arms by way of a horizontally extending pivot shaft connecting the first ends of the two lower guide arms.

23. A windshield adjusting system according to claim 1, wherein said guide arms are arranged such that the movement of said first moving horizontal axis from said upper windshield end position to said lower windshield end position is concurrent with the movement of said second moving horizontal axis from said upper windshield end position to said lower windshield end position, and such that the movement of said first moving horizontal axis from said lower windshield end position to said upper windshield end position is concurrent with the movement of said second moving horizontal axis from said lower windshield end position to said upper windshield end position.

24. A motorcycle according to claim 17, wherein said guide arms are arranged such that the movement of said first moving horizontal axis from said upper windshield end position to said lower windshield end position is concurrent with the movement of said second moving horizontal axis from said upper windshield end position to said lower windshield end position, and such that the movement of said first moving horizontal axis from said lower windshield end position to said upper windshield end position is concurrent with the movement of said second moving horizontal axis from said lower windshield end position to said upper windshield end position.

* * * * *